Patented Feb. 16, 1937

2,071,252

UNITED STATES PATENT OFFICE 2,071,252

A LINEAR POLYACETAL AND PROCESS FOR PRODUCING THE SAME

Wallace H. Carothers, Wilmington, Del., assignor to E. I. du Pont de Nemours & Company, Wilmington, Del., a corporation of Delaware No Drawing. Application January 2, 1935, Serial No. 178

20 Claims. (Cl. 260—151)

This invention relates to linear alkylene polyacetals and to their preparation.

This case is a continuation in part of my application Serial Number 548,701, filed July 3, 1931.

Alkylene acetals derived from ethylene and trimethylene glycol are well known. Hibbert and Hill (J. Am. Chem. Soc. 45, 3117 and 3124 (1923)) prepared acetals of this type by treating the glycol with acetylene or acetaldehyde. The products, which are monomeric cyclic acetals containing 5- and 6-membered rings, are readily distillable mobile liquids of constant boiling points. From tetramethylene glycol and acetylene, Hibbert and Hill (loc. cit.) obtained a 7-membered cyclic acetal in poor yield together with a sirupy product. When they treated octamethylene and decamethylene glycol with acetaldehyde (obtained from paraldehyde and sulfuric acid) they obtained sirupy products which are probably linear polyacetals.

It is also possible that the resinous product obtained by reacting benzaldehyde with pentadiol-1,4 as described by Franke and Gigerl in Monatsh. 49, 8 (1928) is a linear polyacetal.

Cyclic acetals have also been prepared by what is known as the "interchange method", described by Hallonquist and Hibbert in Can. J. Research 8, 129 (1933). This process consists in heating the glycol with a monomeric open-chain acetal, upon which the low-boiling alcohol formed distils over leaving the desired acetal. The open-chain acetal used by these authors is chloroacetal; no mention is made of the use of a catalyst. This method was applied much earlier (1883) to the preparation of open-chain acetals (Houben, "Methoden der Organischen Chemie", vol. 3, p. 204). Johannissian and Akurvian (C. A. 25, 921 (1931) found p-toluene sulfonic acid to be an excellent catalyst for acetal interchange reactions.

Insofar as I am aware, however, linear polyacetals have not heretofore been made by the interchange method. The conversion of linear polyacetals, irrespective of their mode of preparation, into the new superpolymeric acetals, and the preparation of fibers from the latter, have also not been disclosed prior to my invention.

An object of this invention is to prepare linear polyacetals by the interchange method. Another object is to form linear superpolyacetals, i. e., linear polyacetals having a molecular weight of substantially 10,000 or greater. A further object is to prepare linear polyacetals which can be drawn into continuous filaments. A still further object is the manufacture of valuable synthetic fibers.

The first mentioned object of preparing linear polyacetals by the interchange method is accomplished by reacting certain glycols with certain monomeric acetals as is more fully described hereinafter. The objects of my invention which relate to the production of superpolymers are accomplished by heating the lower molecular weight linear polymeric acetal in a "molecular still" under a high vacuum and at a moderately elevated temperature, whereby a portion of the low molecular weight polymer is depolymerized and distilled and the remainder is converted to superpolyacetal.

As used herein, the terms "acetal", "polyacetal", "superpolyacetal", etc. are intended to include ketals, polyketals, and superpolyketals, respectively.

In carrying out my new process for producing by the interchange method linear polyacetals as distinguished from the cyclic acetals made by the prior art referred to above, I treat a glycol in which the hydroxyls are attached to carbon atoms separated from each other by a chain of at least two atoms, with an acetal of a monohydric alcohol having a boiling point lower than that of the glycol, under conditions permitting the removal of the alcohol. In terms of formulae, these statements may be expressed by saying that I treat a compound of the general formula HO—R—OH, R being a divalent organic radical containing at least four atoms in the chain separating the hydroxyl groups, with a compound of the general formula

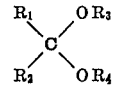

in which $R_1$ and $R_2$ are hydrogen or monovalent hydrocarbon radicals, and $R_3$ and $R_4$ are monovalent hydrocarbon radicals whose hydroxyl compounds $R_3OH$ and $R_4OH$ boil lower than HO—R—OH, under conditions permitting the distillation of $R_3OH$ and $R_4OH$. The monovalent hydrocarbon radicals referred to above are alkyl (saturated or unsaturated) aryl, aralkyl, or alicyclic radicals. Generally $R_1$ is hydrogen and $R_3$ and $R_4$ are alike, preferably a simple alkyl radical, such as methyl, ethyl, or butyl.

My new process for making linear polyacetals may be better understood by comparing it with the prior art method of making cyclic acetals by the interchange method, i. e. through reaction of polyhydroxy compounds, such as ethylene glycol and trimethylene glycol, with an open-chain monomeric acetal, such as chloroacetal. The reaction is reversible and may be expressed as follows:

(1) 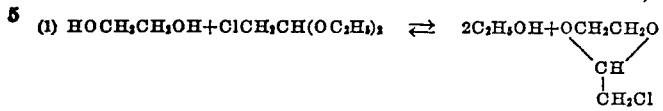

If the mixture is heated so that the ethyl alcohol distils off, the equilibrium shifts to the right and a good yield of the monomeric cyclic acetal is formed.

Now I have found that linear polymeric acetals can be obtained by the interchange method if the glycol is selected as I have previously pointed out which requires the use of a 1,4-glycol or a higher glycol, (higher in the sense that the hydroxyl groups are still further removed from each other in the chain). The reaction may be illustrated by the following general equation in which $n$ is at least 4, $x$ is any positive number, $R_1$ and $R_2$ are hydrogen or monovalent hydrocarbon radicals, e. g. alkyl, aryl, aralkyl, alicyclic, etc. radicals and $R_3$ is a low molecular weight hydrocarbon radical:

(2) 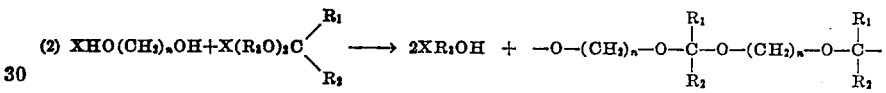 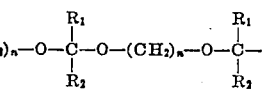

If both $R_1$ and $R_2$ are hydrocarbon radicals the linear polyacetal formed is a linear polyketal.

The procedure for the preparation of the linear polyacetals is relatively simple. The glycol $HO(CH_2)_nOH$ is heated with acetal

$R_3$ being methyl, propyl, isopropyl, butyl, etc.) under conditions which will remove the volatile alcohol, $R_3OH$, which is formed by acetal interchange. The monomeric acetals used in the synthesis may be prepared by the usual methods as illustrated in Organic Synthesis, Collective Vol. I, page 1; Ber. 40, 3020 (1907); Ber. 40, 3908 (1907); Ber. 57, 795 (1924); and Ann. 485, 283 (1931). In the preparation of polyacetal, it is generally advantageous to introduce as a catalyst an acidic material, such as ferric chloride, p-toluene sulfonic acid, or camphor sulfonic acid. The reaction mixture is heated to such a temperature that the volatile alcohol distils off, usually between 100 and 225° C. The polyacetals remain behind as viscous liquids or as solids. They possibly in some instances have associated with them traces of the corresponding monomeric and dimeric cyclic acetals.

In the preparation of linear polyacetals other than linear polyketals by the interchange method, it is not necessary to use the preformed monomeric acetal (indirect method). The polyacetals may be prepared by heating the glycol with a mixture of aldehyde, alcohol, and catalyst under conditions which cause the removal of the alcohol. This procedure will be referred to as the direct method. It will be understood that this method may also be viewed as involving the reaction of the glycol with the acetal formed from the aldehyde and alcohol.

The polyacetals obtained by the methods just described show very wide differences in physical and chemical properties depending upon the glycol and acetal from which they are derived. For example, the polyacetals derived from tetramethylene glycol and formals, isobutyrals, benzals, etc., are obtained in the form of viscous liquids which appear to consist mostly of relatively low molecular weight polymers. These polymers can be depolymerized rather easily; rapid and almost complete conversion to monomeric products occurs merely on distilling the products at atmospheric pressure. On the other hand, the polyacetals derived from the higher glycols, particularly those prepared from the higher glycols and formaldehyde (formals), are often wax-like solids. Polydecamethylene formal may be taken as an example. It dissolves readily in hot ethyl acetate and can be separated as a microcrystalline powder melting at 57° and having an apparent molecular weight of about 2,200. It is much more difficult to depolymerize than the polyacetals derived from tetramethylene glycol.

A satisfactory method for the preparation of superpolymers from the polyacetals is described in my mentioned application, and consists in heating the linear polyacetal in the molecular still (see J. Am. Chem. Soc. 55, 3035) at a moderately elevated temperature, for instance 150–300° C., at a pressure of less than 2 mm. of mercury, and preferably less than 0.1 mm. The condensing surface is placed very close (less than 5 cm.) to the surface of the heated acetal. By this treatment, the volatile material is removed from the polyacetal while the remainder (residue) increases in molecular weight and is changed in physical properties.

It should be clearly understood that the process of forming the superpolyacetals involves two more or less distinct phenomena (1) the coupling of polyacetal molecules of low molecular weight to polymers of much greater molecular weight and quite different properties (superpolymers) and (2) the depolymerization of low molecular weight polyacetals to cyclic or other monomeric or dimeric products.

The superpolymers differ from the ordinary linear polymers in following ways already enumerated in my previously mentioned co-pending application: At ordinary temperatures they are generally hard, tough, horny, elastic masses. Their apparent molecular weight is much higher than the polyacetal from which they were prepared. They are more viscous when molten; they dissolve more slowly and solution is preceded by swelling; their solutions are more viscous; in the massive state they are stronger, tougher, and more pliable.

The following examples are illustrative of the methods used in carrying out my invention. All temperatures are in centigrade.

EXAMPLE I

*Preparation of polyhexamethylene formal by direct method*

A mixture of 35.4 g. of hexamethylene glycol, 10 g. of trioxymethylene, 175 cc. of butyl alcohol, and 0.1 g. of camphor sulfonic acid was heated, and the butyl alcohol was slowly distilled (temperature 135–185°). The residue was heated at 190° under 10 mm. pressure. 35.0 g. of sirupy residue was obtained which solidified in the course of several days to a waxy solid of melting point 38°. This was polymeric hexamethylene formal.

Example II

*Preparation of polyhexamethylene formal by indirect method*

Twenty grams of hexamethylene glycol, 28 g. of dibutyl formal, and a piece of p-toluene sulfonic acid the size of a lentil were heated in a Claisen flask by means of a metal bath. Distillation of butyl alcohol set in at 155°. The temperature was gradually raised during 1½ hours to 200°. A current of $CO_2$ was passed through the melt the last half hour. The residue was further heated under the vacuum of an oil pump at 200–210° for 1½ hours. The product was a viscous brown sirup which did not solidify and may be considered a polyhexamethylene formal of somewhat lower degree of condensation than that of Example I.

Example III

*Preparation of superpolymer of hexamethylene formal*

Five grams of the sirupy polymer, obtained as described in Example II, was placed in a 250 cc. molecular still and heated for 6 hours at 240–250° under 2 mm. pressure. About 0.2 g. of moist crystalline deposit of a strong minty odor collected on the condenser. The distillate was filtered and the crystalline material recrystallized from 70% methyl alcohol. It crystallized in flat needles of M. P. 71–72° and was the cyclic dimer.

The residue was superpolymeric in character. Above its melting point it could be drawn out into strong, pliable, highly oriented fibers.

Example IV

*Preparation of polydecamethylene formal*

Thirty-four and eight-tenths grams of decamethylene glycol, 36 g. of dibutyl formal did not react alone at 200° (bath temperature). When 0.1 g. of $FeCl_3$ was added, ebullition set in at 165°. The temperature was elevated to 200° in three hours. $CO_2$ was passed through the melt the last half hour. Heating was continued under vacuum for 1½ hours at 150–200°. 36.5 cc. of alcohol distilled (theory 37 cc.). The residue solidified on cooling to a light brown wax, weight 38.5 g. Seventeen and five-tenths grams of the residue was dissolved in 150 cc. of hot ethyl acetate, treated with decolorizing carbon and allowed to crystallize. The compound separated as a crystalline powder in spherulites and melted at 56.5–57°. It is soluble in chloroform, benzene, carbon tetrachloride, and xylene; insoluble in alcohol, ether, petroleum hydrocarbons, and acetone.

Example V

*Preparation of superpolymer of decamethylene formal*

Eight grams of the crude material from Example IV was placed in a 250 cc. molecular still and heated at 230–250° for 48 hours under reduced pressure. The slightly moist distillate (2 g.) had a pleasant, rather camphoraceous odor. After crystallization it melted at 93–94°. It was the cyclic dimer.

The residue, a true superpolymer, was tough and leathery and possessed a curious fracture. The fractured surface was white and showed fibrous striations under a lens. It became sticky and definitely rubber-like when heated above its melting point. At considerably elevated temperatures it could be drawn out into tough, pliable filaments or ribbons which furnished sharp X-ray fiber diffraction patterns.

Example VI

*Preparation of superpolymer of decamethylene formal*

Linear polydecamethylene formal, which was prepared using p-toluene sulfonic acid as catalyst and which was much lighter in color than that obtained in Example IV, was purified by dissolving in benzene, washing with water, evaporating and drying to constant weight (anal. C, 70.9%; H, 11.9%). It depolymerized in a molecular still yielding dimer.

The residue was tough, strong, and resilient and could be cold drawn in thin strips to material of exceptional strength. The X-ray protograph showed the X-ray pattern which is typical of fiber structure. These cold drawn strips also exhibited parallel extinction between crossed Nicol prisms. It was rubber-like above the melting point (58–63°).

Example VII

*Preparation of polytetradecamethylene formal and its depolymerization*

Thirteen and two-tenths grams of tetradecamethylene glycol and 10 g. of dibutyl formal were heated together in the usual way with $FeCl_3$ as catalyst. The waxy product was dissolved in hot ethyl acetate and treated with decolorizing carbon. On cooling, the solution deposited the polymer in the form of a microcrystalline powder.

Five grams of the crude polymer was placed in a modified molecular still and heated for 30 hours. Three grams of slightly pasty distillate with a rather musky odor collected. Recrystallized from alcohol it was odorless and melted at 103.5–104°. It was the cyclic dimer.

Example VIII

*Preparation and depolymerization of triethylene glycol formal*

Seventy-five grams of triethylene glycol, 84 g. of dibutyl formal, and 0.12 g. of camphor sulfonic acid were heated together by means of a metal bath at 150–190° for 2½ hours. Nintrogen was blown through the mixture the last hour; 89 cc. of butyl alcohol (theory 91 cc.) distilled. The residue, a viscous sirup, was heated at 200–250° under 1 mm. pressure for 3 hours; 57 g. of partially crystalline distillate collected. Most of this was lost by polymerization on attempting to redistil it. The experiment was repeated and a sample purified for analysis, by fractional crystallization. The product melted at 18–20° and was the cyclic monomer. It had a mild fragrance much like that of triethylene glycol carbonate. When it was heated for 1 hour at 100° with a trace of camphor sulfonic acid, it polymerized to a viscous sirup. When boiled with dilute hydrochloric acid, it evolved formaldehyde.

Example IX

*Preparation and depolymerization of polyhexamethylene benzal*

Thirty-seven and seven-tenths grams of hexamethylene glycol, 50 grams of dimethyl benzal, and 0.1 gram of camphor sulfonic acid were heated together in the usual way for 30 minutes at 115–160°, blowing with nitrogen at the end. (The dimethyl benzal was prepared according to Voss, Ann. 485, 283, from dimethyl sulfite, benzaldehyde, and methyl alcohol). Methyl alcohol distilled in amount 86% of theory. The residue was heated under 2 mm. pressure for one hour at 170–220°. Very little distilled. The residual polymeric product consisted of 62 g. of a light yellow, very viscous sirup of faint benzaldehyde odor. The depolymerization of this product was carried out as follows:

Nine grams of polymer was placed in a small vapor-heated still (alpha-chlorodiphenyl, B. P. 268°) and heated for 7 hours under 0.5 mm. pressure. Five and five-tenths grams of semi-solid distillate collected. The solid phase was filtered and, after two crystallizations from alcohol, gave needles which melted at 122–124°. It was the cyclic dimer.

The filtrate was dissolved in ether, washed with dilute $Na_2CO_3$ and dilute $NaHSO_3$, dried over $K_2CO_3$, and recovered by distillation of the ether. It was then put in a small modified molecular still fitted with a drip cup and heated one hour up to 90° maximum. Five drops of distillate collected. It was mobile liquid with a pleasant odor resembling benzaldehyde and was probably the cyclic monomer. The residue increased in viscosity during the distillation and finally became more viscous than the original polymer.

Example X
Polyhexamethylene Propional

Thirty-four and four-tenths grams of hexamethylene glycol, 59.2 g. of dibutyl propional and 0.1 g. camphor sulfonic acid were heated together 1½ hours at 150–190° with nitrogen blowing through the last 40 minutes; 57 cc. of distillate collected. The residue, a somewhat viscous light-red liquid, was then heated at 3 mm. pressure and 45.5 g. of distillate boiling at 81–130° (mostly at 116°; bath at 145–215°) was received. Only a small amount of residue remained. The distillate was filtered from 2.5 g. of glycol. The filtrate was dissolved in ether, washed with aqueous sodium carbonate and water, and the residue fractionally distilled at 3 mm. pressure; 11.5 g. came over at 77.5–79°. It polymerized to a viscous sirup when heated at 100° with a trace of camphor sulfonic acid.

Example XI
Polyhexamethylene isobutyral

Seventy and eight-tenths grams of hexamethylene glycol, 127.2 g. of dibutyl isobutyral, and 0.1 g. of pure p-toluene sulfonic acid were heated together at 160–200° for 5 hours with blowing with nitrogen the last ¾ hour; 110 cc. of butyl alcohol distilled (theory 110 cc.). The residue was a somewhat viscous light-orange liquid. A sample was removed, dissolved in ether, washed with aqueous sodium carbonate and water, dried with potassium carbonate, and recovered by evaporation of the ether.

The remainder was heated at 1 mm. pressure at 150–190° and, with the exception of 3 g. of dark viscous residue, distilled. The distillate was dissolved in ether, washed with sodium carbonate and water, dried, and fractionated. The main fraction of 50 g. distilled at 96.5° at 2 mm. pressure. There was four grams of residue. The main fraction (monomeric) was analyzed. It was probably the hydroxy alkyl substituted vinyl ether, $HOCH_2(CH_2)_4CH_2OCH=C(CH_3)_2$.

Example XII
Polynonamethylene isobutyral

This compound was prepared in a manner analogous to that used with hexamethylene isobutyral. The monomeric product obtained on distillation boiled at 117–122°/1 mm. It was probably the hydroxy alkyl substituted vinyl ether, $HOCH_2(CH_2)_7CH_2OCH=C(CH_3)_2$.

The monomeric product (ether) had a viscosity of 0.22 poise (Gardner-Holdt tube) which did not change in one hour's heating at 98–100°. A trace of p-toluene sulfonic acid was introduced and heating continued one hour at the same temperature. The viscosity of the cooled liquid was 8 poises. Further heating did not change this value.

Example XIII
Polyhexamethylene heptal

Twenty-nine and five-tenths grams of hexamethylene glycol, 64 g. of dibutyl heptal, and 0.1 g. of camphor sulfonic acid were heated together in the usual way, first at atmospheric pressure, then with blowing, and finally in a vacuum. The theoretical quantity of alcohol distilled during the first two operations and 45 g. of semi-solid distillate of B. P. 120–170°/1 mm. in the last. The liquid was separated, washed with dilute $Na_2CO_3$, and dried. It was then distilled at 1 mm. The largest fraction, 9 g., distilled at 129–135°. It was yellow and had a very faint pleasant odor. It was monomeric, probably

$HOCH_2(CH_2)_4CH_2OCH=CH(CH_2)_4CH_3$

Example XIV
Polyhexamethylene ketal

Eighteen and eight-tenths grams of dibutyl ketal, $(CH_3)_2C(OC_4H_9)_2$, 11.8 g. of hexamethylene glycol, and 0.05 g. of camphor sulfonic acid were heated together at 145–170° (bath temperature) for 40 minutes, blowing with nitrogen the last 5 minutes. Practically the theoretical quantity of butyl alcohol distilled. The sirupy residue was then heated at 5 mm. pressure up to 210° bath temperature. Twelve and five-tenths grams of yellow distillate, mostly crystalline, distilling at 92–130°, were collected. The crystalline material, amounting to 9 g., was separated and identified as hexamethylene glycol. The filtrate, which possessed a mild floral fragrance, was comprised mostly of cyclic ketal. The residue from the depolymerization was quite different from the original sirup, being a dark-orange, very viscous product of high molecular weight.

Various other polyacetals and their superpolymers may be prepared by procedures similar to those given in the examples. The following may be mentioned as examples: tetramethylene formal, pentamethylene formal, nonamethylene formal, octadecamethylene formal, hexamethylene n-butyral, tetramethylene isobutyral, pentamethylene isobutyral, decamethylene isobutyral, tetramethylene benzal, decamethylene benzal.

The amount of residue or superpolymer may differ considerably for the different compounds. In some instances, as in the case of hexamethylene acetal, decamethylene acetal, and hexamethylene ketal, the yield of superpolymer may be small or inconsequential because of the decomposition which takes place with depolymerization.

Although all 1,4 and higher glycols (the term "higher" being used in the special sense previously mentioned of indicating that the hydroxyl groups are still further separated in the carbon chain) yield linear polyacetals by the interchange treatment described herein, and under the proper conditions yield the superpolymer in at least a small amount, only the polyacetals derived from formaldehyde (formals) and glycols higher than 1,4 give good yields of superpolymers when subjected to the treatment described herein.

The preparation of linear polyacetals is not limited to the use of the glycols cited in the foregoing examples. It is necessary that the glycols be 1,4 or higher as previously described, but the hydroxyl groups need not necessarily be attached to the end carbon atoms. Moreover, the glycols may have substituent groups, such as ethoxy, etc., and they may contain unsaturated linkages. However, polyhydric alcohols having more than two hydroxyl groups cannot be substituted for the glycols since the presence of more than two functional groups (hydroxyl in this case) introduces the possibility of developing a three-dimensional polymeric structure. The term "linear" as used herein is intended to exclude products of such character which are wholly dissimilar in both their properties and behavior to those derived from bifunctional compounds such as glycols. Examples of other glycols which may be used in this invention are tetramethylene glycol, alpha-methyl tetramethylene glycol, alpha-dimethyl tetramethylene glycol, alpha-methyl pentamethylene glycol, octamethylene glycol, 1,4-dihydroxycyclohexane, phthalyl alcohol, and 1,3-xylylene alcohol. It is within the scope of this invention to use a mixture of glycols.

A wide variety of open-chain monomeric acetals and ketals may be used in the preparation of the linear polyacetals and ketals. As already indicated, the use of an acetal or ketal derived from an alcohol of relatively low boiling point is desirable. Among other compounds of this class which may be used in addition to those cited in the examples are dimethyl butyral, dimethyl crotonal, chloroacetal, 1,1,2-triethoxy-butane, diamyl benzal, dimethyl cinnamal, diethyl anisal, the diethyl ketal of ethyl methyl ketone, and the butyl ketal of cyclohexanone. As shown in Example I, it is not necessary to use a preformed acetal in the preparation of the linear polyacetal; a mixture of aldehyde, alcohol, and catalyst may be heated with the glycol. It is also possible to use a mixed acetal or mixtures of acetals in the preparation of the polyacetals by the interchange method.

Ferric chloride, p-toluene sulfonic acid, and camphor sulfonic acid have been disclosed as catalysts for the preparation of the polyacetals. Other halides, e. g., stannic chloride, antimony trichloride, aluminum chloride, and hydrogen chloride may be employed as well as other sulfonic acids, such as benzene sulfonic acid, etc.; in fact, acidic compounds in general, e. g., magnesium sulfate and potassium acid sulfate, may be used as catalysts. It is desirable, however, to select a catalyst which is mild in its action and does not cause excessive darkening or decomposition. The sulfonic acids are particularly suitable. With an acetal of acidic properties, such as chloroacetal, it is often unnecessary to add a catalyst.

Although the molecular still is preferably used in most instances for converting the linear polyacetal into the superpolymer, other methods may be used depending upon the nature of the substance treated. In some instances, conventional distillation equipment is adequate to effect the conversion. Another method consists in passing an inert gas or an organic vapor (e. g., saturated aliphatic hydrocarbon gases) through or over the molten polymer with or without the use of reduced pressure to carry away the volatile products. The reaction may also be carried out in a solvent with or without the addition of catalysts with arrangements for distilling and returning the solvent after separating the volatile products of the reaction distilling with it. The purpose may likewise sometimes be effected simply by prolonged heating in a good vacuum, and it is advantageous when using this method to have the material spread out in a thin layer. In certain cases also this purpose may be effected by using powerfully adsorbent materials such as silica gel, adsorbent carbon activated alumina, etc., to bring about the irreversible absorption of the volatile reaction products. The reaction must be carried out at a temperature high enough to make the rate of reaction appreciable but low enough to avoid any thermal decomposition.

It will be understood that the manufacture of my new superpolymers is not limited to treatment of the linear polymers made by the requirements of the interchange method described above. The superpolymers may be made by treating the lower molecular weight linear polymers, regardless of their method of formation, in the molecular still or by treating the linear polymer in one of the alternate methods set forth above for converting the linear polymer into the superpolymer.

Before referring to the advantages of the interchange method described herein for preparing the linear acetal it may be well to consider the theory upon which the reaction is apparently based. In the preparation of the linear acetal the following equilibrium is set up:

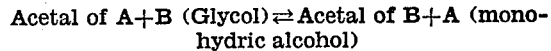

Acetal of A+B (Glycol) ⇌ Acetal of B+A (monohydric alcohol)

For this reason the temperature required to cause the reaction to shift to the right with the formation of acetal B (linear polyacetal) is dependent, among other things, upon the boiling point of A and upon experimental conditions, including the nature of the catalyst and the pressure. For example, if reduced pressure is used, the alcohol A is removed more readily and the reaction can be carried out at a lower temperature than under atmospheric pressure. Superatmospheric pressure is sometimes desirable when using a low boiling acetal, e. g., dimethyl formal.

The interchange procedure I have described affords a convenient method for the preparation of polyacetals since the rate and extent of the reaction can be readily followed by measuring the amount of alcohol which is removed by distillation. The acetal has little tendency to escape with the alcohol. This process is superior to the method in which a glycol and an aldehyde are used as reactants because the distillation of the water formed in this reaction causes the removal of a large portion of the unreacted aldehyde. This is especially true when low boiling aldehydes are used. Moreover, the interchange method makes it possible to prepare polyketals (from glycols and monomeric ketals) which could not be prepared directly from the glycol and ketone.

The linear acetals may be used as adhesives, impregnating agents, and as ingredients in coating compositions, e. g., as softeners, resins, or modification agents for cellulose derivatives, etc.

The tough and elastic superpolymers may be used in plastic compositions or molding compositions, or as film forming materials. They may also be used as modifying agents for cellulose acetate or other cellulose derivatives. The superpolymers may also be used with considerable advantage in paints, varnishes, lacquers and enamels in a number of ways. They may be used as substitutes for the resin constituent, as substitutes for the softener constituent, as substitutes for the total resin plus softener constituents, or as partial substitutes for either the resin constituent or the softener constituent in clear or pigmented lacquer compositions. They may also be used by themselves for the preparation of lacquers along with pigments in the formulation of enamel compositions. They may also be used with other resins, e. g., in admixture with phenol-formaldehyde resins, and resin or oil modified polyhydric alcohol-polybasic acid condensation products. These latter condensation products are made, as understood by those skilled in the art, by reacting together with heat treatment a polyhydric alcohol such as glycerol; a polybasic acid, such as phthalic acid; and a natural basin and/or a fatty oil, such as linseed oil, or the corresponding amount of oil acids. Use of the compounds disclosed in this invention in lacquer and enamel compositions imparts marked improvements in toughness, adhesion and flexibility characteristics without any appreciable sacrifice in other characteristics such as drying qualities, hardness, water resistance, thermoplasticity, and solids content. Since these compounds function as toughening and flexibilizing agents, and since there is no chemical change in these compositions on aging, they contribute to systems in which they are used considerably improved retention of flexibility and consequently a higher order of durability.

The foregoing compounds may also be used for coating sheeted materials such as cloth, paper, and leather. For this application they are generally mixed with pyroxylin and used in combination with softening ingredients such as castor oil, cottonseed oil, tricresyl phosphate, acetyl laurin, etc. They may also be used as modifying ingredients in the preparation of plastic compositions for use either in the fabrication of molded articles or sheeted materials for use in various applications such as in the manufacture of safety glass. It is to be understood that in all of these applications the compositions disclosed in this invention may be used either alone, in combination with cellulose derivatives such as cellulose acetate, cellulose nitrate, ethyl cellulose and benzyl cellulose; in combination with natural resins such as rosin, dammar, Congo, Pontianac and Manila gums; along with synthetic resins such as phenolformaldehyde, urea-formaldehyde, actone-formaldehyde, and polyhydric alcohol-polybasic acid condensation products; and in combinations with softeners such as triacetin, triphenyl phosphate dibutyl phthalate, tricresyl phosphate, $\beta$-ethoxyethyl stearate, acetyl laurin, as well as castor oil, cottonseed oil, and other vegetable oils.

An especially valuable and remarkable property of the superpolyacetals of the present invention resides in their capacity to be drawn as continuous filaments into strong, flexible fibers which show a high elastic recovery and a high ratio of wet strength to dry strength. These fibers resemble natural fibers, not only in outward physical properties, but also in molecular structure, as shown by X-ray methods. When the superpolymers are drawn into fibers under stress the X-ray pattern changes from a typical powder diffraction pattern (see below) to one characteristic of oriented natural fibers. The characteristic features of these two types of X-ray patterns are understood by those skilled in the art and are fully discussed in Jour. Am. Chem. Soc. Vol. 54, pp. 1579–1587 (see especially Figures 4 and 5, p. 1581).

This fiber-forming capacity of the superpolyacetals appears to depend upon the extraordinary facility with which they accept a very high degree of permanent orientation under the action of mechanical stress. In the massive state at ordinary temperatures the superpolyacetals, especially the superpolyformals, are generally tough, opaque masses. This opacity is associated with a certain degree of microscopic or sub-microscopic crystallinity, as evidenced by the fact that, when examined by the usual X-ray methods the superpolyacetals furnish powder diffraction patterns, and by the fact that the opacity of these superpolymers, when they are heated, usually completely disappears at a definite temperature. It is believed that this ability to accept high orientation along the fiber axis is due in large measure to this crystallinity, a very unusual and, so far as known, heretofore unattained property in a synthetic product of such high molecular weight.

Except in a few instances (those in which the melting point of the superpolyacetals lies so high that melting is accompanied by decomposition), threads of these superpolymers are readily obtained by touching a molten specimen with a rod and drawing the rod away. When this drawing is done very slowly the threads closely resemble the mass from which they were drawn, that is, they are opaque and show approximately the same melting point as before. Very fine threads prepared in this way are lacking in pliability and are somewhat fragile. However, if such threads are subjected to stretching at ordinary or slightly elevated temperatures they are profoundly changed in their physical properties. The stretching results in a permanent elongation; the original thread first separates into two sections joined by a thinner transparent section, and as the stretching continues this transparent section grows until the opaque sections are completely exhausted. The fiber produced in this way is very much stronger than the thread from which it was drawn. It is also more pliable and elastic. Its melting point is changed and its transparency and luster increased. It exhibits a high degree of birefringence and parallel extinction between crossed Nicol prisms and furnishes a typical oriented fiber diagram when examined by X-ray methods in the usual way. The above extremely unusual and peculiar phenomenon, which is exhibited to an extraordinary degree by the superpolyacetals, may be more thoroughly understood by reference to Jour. Am. Chem. Soc. Vol. 54, p. 1580.

The above method of imparting new properties to the polymers is referred to as "cold-drawing". Such oriented fibers may be obtained also directly from a molten mass of the polymer if the thread is drawn out rapidly enough to produce tension during the drawing.

For the actual manufacture of fibers from the polymers of the present invention, I prefer to use the methods referred to below. That is, I spin the molten polymer, or a solution made by dissolving the polymer in a solvent, through a fine nozzle or spinneret. Thus, I may prepare a solution of the polymer either alone or together with another fiber forming material such as cellulose derivatives, e. g., cellulose nitrate, cellulose acetate, ethyl cellulose, etc. in a solvent such as chloroform and extrude the solution through a fine nozzle or spinneret into a chamber maintained at elevated temperature to accelerate the evaporation of the solvent. Such a solution instead of being spun into a chamber containing air may also be spun directly into a liquid capable of dissolving the solvent but not the polymer.

In a similar manner many of the polymers of this invention can be spun directly in the molten state from a spinneret maintained at a suitably elevated temperature. In this case, no arrangements are necessary to provide for the removal of solvent. Whatever method is used for spinning the fibers it is necessary to finally submit the threads to the action of mechanical stress or stretching to produce the high orientation which is associated with a high degree of strength, pliability and elasticity.

It has already been mentioned that the fibers prepared from the materials of this invention not only have a high degree of strength, pliability and luster but they are superior to any artificial fibers known hitherto in the fact that their wet strength is substantially equal to their dry strength and in the fact that their elastic recovery resembles that of natural silk and in certain instances is even better than natural silk. A further unique property of the polymers of the present invention lies in the fact that it is possible to spin them in the form of exceedingly fine filaments. Thus, it is easily possible to spin filaments as fine as ½ denier, or even less, and these fibers have very good properties.

When selecting superpolymers for fiber formation those superpolymers should be chosen which are sufficiently soluble in some solvent to give a solution which can be spun or sufficiently thermoplastic at some temperature below their decomposition temperatures to be drawn into fibers.

The superpolymers of the present invention comprehend those polyacetals which have a molecular weight of 10,000 or above. It is not until the molecular weight comes within this value that the fiber forming properties of the polymer are observed. It is characteristic of the superpolymers that they can be drawn out from the molten mass, without the aid of solvent or plasticizer, into fibers or threads showing a typical X-ray orientated fiber diagram.

It is to be understood that the production of artificial fibers as disclosed herein through the actual synthesis of the fiber forming material is to be sharply distinguished from the manufacture of fibers from materials in which the fiber forming molecules simply serve as the initial raw material. In the prior methods of making fibers, as for instance artificial silk from cellulose, the fiber forming molecules are not synthesized as in the present invention but are simply derived from a cellulosic natural product.

As many apparently widely different embodiments of this invention may be made without departing from the spirit and scope thereof, it is to be understood that I do not limit myself to the specific embodiments thereof except as defined in the appended claims.

I claim:
1. A synthetic linear polyacetal obtainable by a condensation reaction between a glycol and an acetal of a monohydric alcohol having a molecular weight greater than 10,000.
2. A synthetic crystalline linear polyacetal.
3. A synthetic linear polyacetal capable of being drawn into fibers showing by characteristic X-ray fiber diffraction patterns orientation along the fiber axis.
4. A synthetic linear polyacetal which is fusible without decomposition, and which is capable of being drawn without the aid of solvent or plasticizer into fibers showing by characteristic X-ray fiber diffraction patterns orientation along the fiber axis.
5. A synthetic linear polyacetal capable of being drawn into orientated fibers exhibiting birefringence with parallel extinction between crossed Nicol prisms and exhibiting characteristic X-ray fiber diffraction patterns.
6. A synthetic linear polyacetal showing in the massive state an X-ray powder diffraction pattern, said polyacetal being capable of being drawn into fibers having an X-ray diffraction pattern typical of natural fibers.
7. The linear polyacetal set forth in claim 2 which comprises a reaction product obtained from formaldehyde and a glycol the hydroxyl groups of which are separated by a chain of more than four atoms.
8. The linear polyacetal set forth in claim 2 which comprises the reaction product of an acetal of a monohydric alcohol and a glycol whose hydroxyl groups are separated by a chain of more than four atoms.
9. A linear polyformal.
10. A process of making polyacetals which comprises heating an acetal of a monohydric alcohol with a glycol whose hydroxyl groups are separated by a chain of at least four atoms.
11. A process of making polyacetals which comprises heating a glycol with aldehyde and monohydric alcohol, the hydroxyl groups in said glycol being separated by a chain of at least four carbon atoms.
12. The process set forth in claim 10 in which the hydroxyl groups in said glycol are separated by a chain of more than four carbon atoms.
13. The process set forth in claim 11 in which the hydroxyl groups in said glycol are separated by a chain of more than four carbon atoms.
14. A process which comprises removing the volatile products from a linear polyacetal under reduced pressure and under conditions causing further condensation, and continuing such removal of volatile product with continued polymerization while maintaining the condensation reaction conditions until a higher polymerized residue is obtained which has a molecular weight of at least 10,000.
15. A process which comprises removing the volatile products from a linear polyacetal under conditions which particularly facilitate the removal of volatile product from the condensation product, and continuing such removal of volatile product with continued polymerization while maintaining the condensation reaction conditions until a higher polymerized residue is obtained which is capable of being drawn into fibers showing appreciable orientation along the fiber axis.
16. A process which comprises removing the volatile products from a linear polyacetal under conditions which particularly facilitate the removal of volatile product from the condensation product, and continuing such removal of volatile product with continued polymerization while maintaining the condensation reaction conditions until a higher polymerized residue is obtained which is capable of being drawn into fibers showing appreciable orientation along the fiber axis, said linear polyacetal being derived from formaldehyde and a glycol the hydroxyl groups of which are separated by a chain of more than four atoms.

17. A process which comprises forming a linear polyacetal by reacting an acetal of a monohydric alcohol with a glycol whose hydroxyl groups are separated by a chain of at least four atoms, removing the volatile products from the polyacetal under conditions which particularly facilitate the removal of volatile product from the condensation product, and continuing such removal of volatile product with continued polymerization while maintaining the condensation reaction conditions until a higher polymerized residue is obtained which is capable of being drawn into fibers showing appreciable orientation along the fiber axis.

18. A process which comprises forming a linear polyacetal by reacting a glycol with aldehyde and monohydric alcohol, and removing the volatile products from the polyacetal under conditions which particularly facilitate the removal of volatile product from the condensation product, and continuing such removal of volatile product with continued polymerization while maintaining the condensation reaction conditions until a higher polymerized residue is obtained which is capable of being drawn into fibers showing appreciable orientation along the fiber axis, the hydroxyl groups in said glycol being separated by a chain of at least four atoms.

19. The process set forth in claim 17 in which the hydroxyl groups in the glycol are separated by a chain of more than four carbon atoms.

20. The process set forth in claim 18 in which the hydroxyl groups in the glycol are separated by a chain of more than four carbon atoms.

WALLACE H. CAROTHERS.